US008321424B2

(12) United States Patent
Li et al.

(10) Patent No.: US 8,321,424 B2
(45) Date of Patent: Nov. 27, 2012

(54) BIPARTITE GRAPH REINFORCEMENT MODELING TO ANNOTATE WEB IMAGES

(75) Inventors: Mingjing Li, Beijing (CN); Wei-Ying Ma, Beijing (CN); Zhiwei Li, Beijing (CN); Xiaoguang Rui, Anhui (CN)

(73) Assignee: Microsoft Corporation, Redmond, WA (US)

( * ) Notice: Subject to any disclaimer, the term of this patent is extended or adjusted under 35 U.S.C. 154(b) by 878 days.

(21) Appl. No.: 11/848,157

(22) Filed: Aug. 30, 2007

(65) Prior Publication Data
US 2009/0063455 A1 Mar. 5, 2009

(51) Int. Cl.
*G06F 7/00* (2006.01)
*G06F 17/30* (2006.01)

(52) U.S. Cl. .......... 707/748; 707/737; 707/769; 706/45; 715/230

(58) Field of Classification Search .................. 707/737, 707/748, 769; 706/45; 715/230
See application file for complete search history.

(56) References Cited

U.S. PATENT DOCUMENTS

| | | | | |
|---|---|---|---|---|
| 5,845,288 | A * | 12/1998 | Syeda-Mahmood | 707/102 |
| 6,285,995 | B1 * | 9/2001 | Abdel-Mottaleb et al. | 707/737 |
| 7,702,185 | B2 * | 4/2010 | Keating et al. | 382/305 |
| 7,814,040 | B1 * | 10/2010 | Zhang et al. | 706/45 |
| 2006/0143176 | A1 * | 6/2006 | Mojsilovic et al. | 707/6 |
| 2007/0239694 | A1 * | 10/2007 | Singh et al. | 707/3 |
| 2007/0271226 | A1 * | 11/2007 | Zhang et al. | 707/3 |
| 2007/0271503 | A1 * | 11/2007 | Harmon et al. | 715/512 |
| 2008/0195657 | A1 * | 8/2008 | Naaman et al. | 707/104.1 |
| 2009/0123021 | A1 * | 5/2009 | Jung et al. | 382/100 |

OTHER PUBLICATIONS

Srinivasan et al., IJCAI-2007 Workshop on Multimodal Information Retrieval, Hyderabad, India, Jan. 6, 2007, "A Bipartite Graph Model for Associating Images and Text".*
Wang et al., "Scalable search-based image annotation of personal images". Proceedings of the 8th ACM international workshop on Multimedia information retrieval, 2006, 269-278.*
Zhou et al., "Automatic Image Annotation by an Iterative Approach: Incorporating Keyword Correlations and Region Matching", CIVR, Jul. 9, 2007.*
Wang et al., "AnnoSearch: Image Auto-Annotation by Search", IEEE, CVPR, 2006, p. 1483-1490.*
Cheng et al. "Effective Image Annotation for Search Using Multi-level Semantics", ICADL 2003, LNCS 2911, pp. 230-243, 2003.*
Pucher, "Performance Evalution of WordNet-based Semantic Relatedness Measures for Word Prediction in Conversational Speech", Dec. 2, 2004, pp. 1-12.
Zeng, "Learning to Cluster Web Search Results", SIGIR 2004, ACM, 2004, 8 pages.

* cited by examiner

*Primary Examiner* — Shew-Fen Lin
(74) *Attorney, Agent, or Firm* — Lee & Hayes, PLLC (57) ABSTRACT

Systems and methods for bipartite graph reinforcement modeling to annotate web images are described. In one aspect the systems and methods implement bipartite graph reinforcement modeling operations to identify a set of annotations that are relevant to a Web image. The systems and methods annotate the Web image with the identified annotations. The systems and methods then index the annotated Web image. Responsive to receiving an image search query from a user, wherein the image search query comprises information relevant to at least a subset of the identified annotations, the image search engine service presents the annotated Web image to the user.

11 Claims, 3 Drawing Sheets

Fig. 1

Fig. 2

Figure 1:
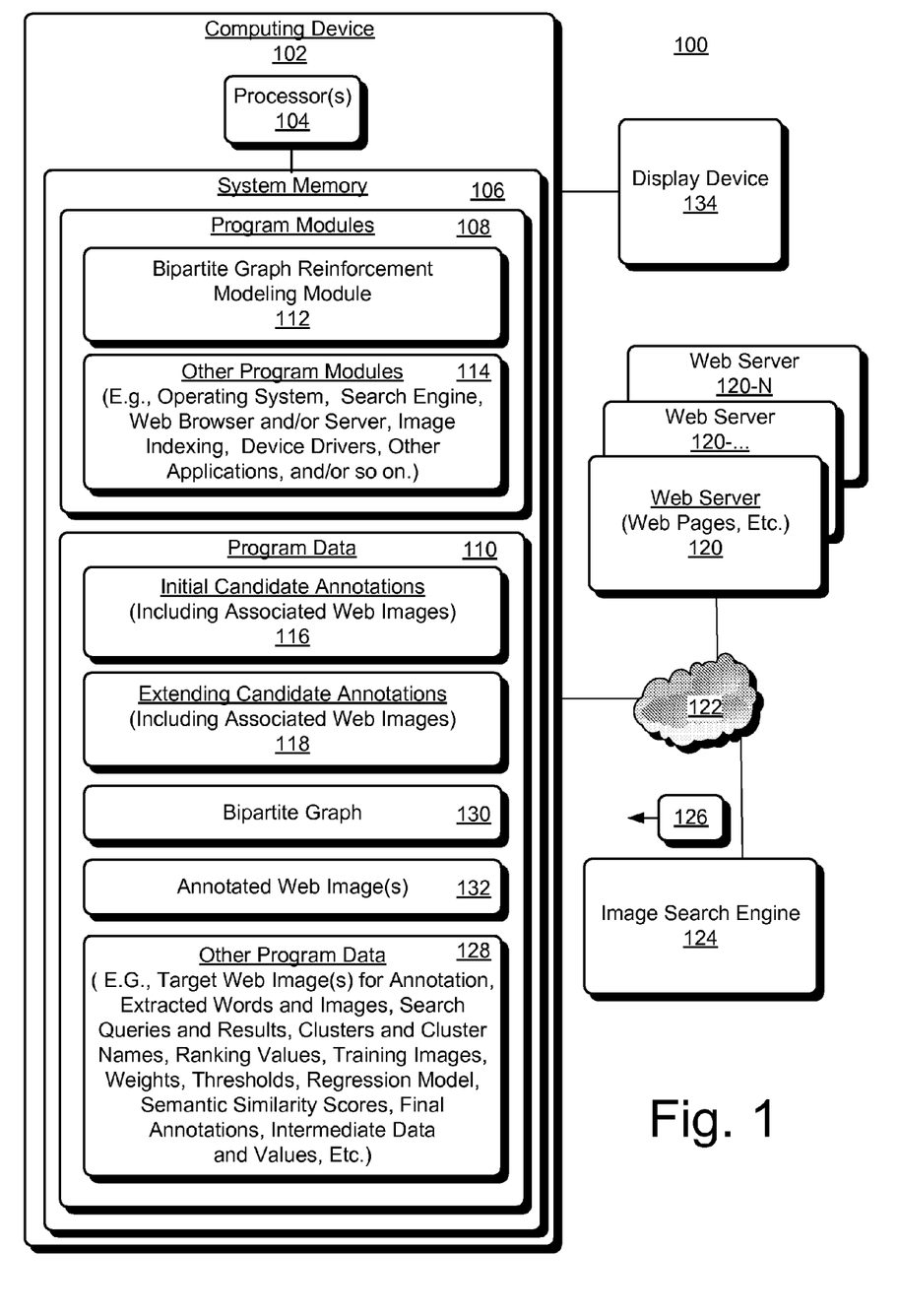

Fig. 3 ns this end, computing device 102 includes one or more processors 104 coupled to a tangible computer-readable data storage medium such as a system memory 106. System memory 106 includes, for example, volatile random access memory (e.g., RAM) and non-volatile read-only memory (e.g., ROM, flash memory, etc.). Processor 104 may be a microprocessor, microcomputer, microcontroller, digital signal processor, etc. System memory 106 includes program modules 108. Each program module 108 is a computer-program application including computer-program instructions for execution by processor 104. System memory 106 also includes program data 110 that is generated and/or used by respective ones of the program modules 108.

In this implementation, for example, program modules 108 include bipartite graph reinforcement modeling module ("BGRM") 112 and "other program modules" 114 such as an Operating System (OS) to provide a runtime environment, device drivers, other applications, etc. BGRM 112, given a web image, generates two sets of candidate words/annotations—initial annotation candidates ("initial candidates") 116 and extending annotation candidates ("extending candidates") 118. In one implementation, web image(s) are retrieved from respective web page(s) hosted by web server 120 (e.g., web server 120-1). Web server 120 is coupled to computing device 102 across communication network 122 such as the Internet. In this implementation, for example, for the given web image (a "target image") hosted by a web page, BGRM 112 extracts initial annotation candidates 116 using information provided by conventional annotation extraction techniques and/or from text surrounding the web image in the web page hosting the web image. Such information includes, for example, file name, ATL text, URL, titles, description, surrounding text, etc. After stop word removal and stemming, BGRM 112 analyzes visual and textual information associated with each of the initial candidates 116 to rank the textual information to reflect semantic similarity to the target image. In one implementation, for example, BGRM 112 ranks each initial candidate word using a conventional ranking technique such as tf*idf, etc. Associated/surrounding text, however, may be noisy and incomplete, not entirely describing semantic content of web image(s) proximal to the text.

To address assumed limitations of the initial candidates 116, BGRM 112 extends the initial candidates 116 with extending candidates 118. Extending candidates 118 are mined from a large-scale image database. In this implementation, the large-scale image database is the set of web images associated with web pages hosted by web servers 120. To this end, each initial candidate word is submitted as a query to image search engine 124 to mine the database and obtain search results 126. Such queries are shown as a respective portion of "other program data" 128. These searches are based on an assumption that if certain images in the database are visually similar to the target image (i.e., the web image being annotated) and semantically related to the queried words, the textual descriptions associated with these other web images may also correlate to the target image.

BGRM 112 mines search results 126 for each word in the initial candidates 116 by clustering the search results, and thereby, obtaining a set of cluster names. These cluster names are the extending candidates 118. BGRM 112 ranks the extending candidates based on the average similarity between images in the corresponding cluster and the target image for annotation. BGRM 112 then models the initial and extending candidates as a bipartite graph 130 by treating the initial and extending candidates as respective sets of disjoint graph vertices. BGRM 112 evaluates relationships between respective ones of the vertices (candidate annotations) in the graph 130 to identify annotations that pertain to semantically similar concepts. In view of these relationships, BGRM 112 re-ranks the initial and extending annotations 116 and 118 using a ranking reinforcement algorithm that leverages identified relations between vertices in the bipartite graph 130. BGRM 112 annotates the target image with the top ranked annotations from the initial and the extending annotations to generate annotated web image 132. Conventional image indexing application(s) are then used to index annotated web image(s) 132 to present the user (e.g., via display device 134) with image(s) and/or text relevant to a search query.

The following sections provide further exemplary details of how system 100 annotates web image(s) with top ranked annotations, according to one or more embodiments.

Exemplary Extending Annotation Generation

BGRM 112 determines extending annotations 118 using a search-based method. Specifically, each initial annotation 116 and its corresponding image are submitted in a query to an image search engine 124 to find semantically related and visually related images (i.e., search results 126). This is a text-based image search. BGRM 112 extracts and identifies more annotations from the search results. For one target web image I, word $q_i$ in initial candidate annotation words Q is used to query the image search engine to find semantically related images. This process is applied for each initial candidate annotation identified for I (i.e., the target image for annotation). Then, from the semantically related images provided by the search results 126, BGRM 112 identifies visually related images by determining content-based image similarity between the target image and the images found on the web. In one implementation, for example, the search result (SR) of word w in image I (the target image for annotation) is represented by $SR(I, w) = \{(im_1, sim_1, de_1), (im_2, sim_2, de_2), \ldots, (im_I, sim_I, de_I)\}$. Where im is the web image obtained by querying I and w, sim is the visual similarity between im and I, and de is the textual description of im. I gives the total number of images in the search result 126. Extending words are extracted by mining the search result (SR) 126 for each word in initial annotations 116 using a conventional search result clustering (SRC) algorithm (e.g., Hua-Jun Zeng, Qi-Cai He, Wei-Ying Ma, et al., "Learning to Cluster Web Search Results", *SIGIR*, 2004). In this implementation, SRC clusters documents by ranking salient phrases. SRC first extracts salient phrases and calculates several properties, such as phrase frequencies, and combines the properties into a salience score based on a pre-learned regression model. SRC is capable of generating highly readable cluster names. In this implementation, the cluster names are used as respective extending candidate annotations 118. For each target image for annotation, SRC is used to cluster the descriptions in the search result. The cluster names are merged and duplicate words are discarded. Remaining words in the cluster names are extending candidate annotations X (118). In general, a precise initial word may propagate more precise extending words. Additionally, because the visual information also essentially extends words, an imprecise initial candidate/word may also result in more precise extending words as compared to the initial word.

Exemplary Initial Candidate Annotation Ranking Operations

After acquiring initial candidate annotations 116 for each target web image, a ranking value is defined for each initial candidate using both visual and textual information to measure how consistent it is with the corresponding target web image. The visual consistence of an initial word may be indicated by the visual similarities between images in its search results and the target image. These scores are utilized as the visual ranking value of an initial word. In this implementation, BGRM 112 first sorts the visual similarity scores in descending order. Then, BGRM 112 calculates the average of top K visual similarity scores as the ranking value. And for each initial word $q_i$ associated with the target image I, a visual ranking value rankv($q_i$|I) is calculated, for example, as follows:

$$rankv(q_i \mid I) = \frac{1}{K}\sum_{j=1}^{K} sim_{q_i}(j, I) \quad (1)$$

Where sim(.) is the image similarity scores ranked in the descending order. To estimate the textual consistence, the similarity of keywords is computed within a web image first by checking how frequently one keyword appears in the search result of another.

For a target image I, BGRM 112 counts the frequency $Feq_{qk}(q_i)$ of the initial word $q_i$ appearing in textual descriptions of images in the search result of the initial word $q_k$ and the frequency $Feq_{qi}(q_k)$ of $q_k$ appearing in the search result of $q_i$. $Feq_{qk}(q_i)$ and $Feq_{qi}(q_k)$ reflect the local relation of $q_i$ and $q_k$, so the similarity between them is defined, for example, as follows:

$$sim(q_i, q_k|I) = Feq_{qk}(q_i) + Feq_{qi}(q_k) \quad (2)$$

Generally speaking, the more common a keyword is the more chance it will associate with other keywords. However this kind of associations has lower reliability. Therefore, counts are weighted according to the uniqueness of each keyword, i.e. setting a lower weight to frequent keywords and a higher weight to unique keywords. Finally, the similarities of initial words in the target image I are calculated by modifying equation 2 as follows:

$$sim(q_i, q_k \mid I) = Feq_{qk}(q_i)\log(ND/N(q_i)) + Feq_{qi}(q_k)\log(ND/N(q_k)) \quad (3)$$

Where $N(q_i)$ is the number of the word $q_i$ occurring in the descriptions of training images, and ND is the total number of images in the training dataset. In this implementation, several million training images were collected from some photo sharing web sites. A text-based image search system such as that described herein was built using these training images. Each initial annotation is used to query this search system and get its search result. It can be appreciated that such training images can be acquired in other manners.

This approach measures textual similarity between keywords in a local way. It considers not only similarity between words, but also takes into account their relations to a corresponding image. When two words are closely related to the target image for annotation and always appear together in the web page, textual similarity between the two words is high. Conventional methods typically consider only relation between two words. Compared with the traditional methods, the local textual similarity measure is more suitable for the annotation ranking task of system 100. After calculating the textual similarity, BGRM 112 determines the textual ranking value for the initial word $q_i$ (rankt($q_i$|I)) as a normalized summation of the local textual similarities between $q_i$ and the other initial words in image I. For example, in one implementation:

$$rankt(qi \mid I) = \sum_{k(\neq i)} simt(qi, qk \mid I) \bigg/ \sum_{i(\neq k)}\sum_{k(\neq i)} simt(q_i, q_k \mid I) \quad (4)$$

In equation 4, the denominator is the normalization factor.

After obtaining above two types of initial word rankings, BGRM 112 normalizes the initial rankings into [0, 1]. These normalized rankings are then fused using a weighted linear combination scheme to define the ranking value of an initial word $q_i$, as shown for example and equation 5:

$$F_O(q_i|I) = a \times rankv(q_i|I) + (1-a) \times rankt(q_i|I) \quad (5)$$

Referring to equation 5, a is the weight ranging from 0 to 1. In one implementation, and because in web-based approaches, text features are generally more effective than image features, the value of parameter a is less than 0.5. In other implementations, the value is greater than or equal to 0.5.

Exemplary Extending Candidate Annotation Ranking Operations

Ranking values for extending annotations 118 are defined differently than how rankings for initial candidates 116 are defined. In this implementation, an extending candidate is actually the name of a search result cluster. In view of this, the ranking value of an extending candidate is estimated by average similarity between images in a corresponding cluster (for which the extending candidate is a cluster name) and the target image for annotation. If member images of a cluster are relevant to the query, the concepts learned from this cluster are likely to represent the content of the query image (i.e., an image associated with an initial annotation 116). Considering uniqueness of each keyword, such ranking values are also weighted using the textual information to define the ranking score, as shown for example, in equation 6.

$$C_O(x_i|I) = v(x_i)\log(ND/N(x_i)) \quad (6)$$

Referring to equation 6, $x_i$ is an extending word of image I and $v(x_i)$ is the average member image similarity, and $C_O$ is the initial ranking value of an extending annotation.

Exemplary Bipartite Graph Construction

This section describes exemplary BGRM 112 operations to construct bipartite graph 130. Initial and extending candidate annotations 116 and 118 are heterogeneous annotations for web images. As described above, initial words (116) represent direct description of the corresponding target image for annotation, while extending words (118) are mined in a large-scale image database. As such, extending words indirectly describe the target image by propagating descriptions from semantically and visually related images. Additionally, extending words with the same initial word tend to be similar to each other. So similarities between extending words are partly determined by their initial word. Similarities between initial words do not have such characteristics. Therefore, initial and extending words are not re-ranked using a unified measure. However, initial and extending words may have close relations. For example, if an initial word is precise, its corresponding extending words are likely to also be precise, and vice versa. In view of such characteristics, BGRM 112 narrows the candidate annotations 116 and 118 for a web image using a bipartite graph. In the mathematical field of graph theory, a bipartite graph is a graph whose vertices can be divided into two disjoint sets V1 and V2 such that every edge connects a vertex in V1 and one in V2; that is, there is no edge between two vertices in the same set.

To construct bipartite graph G 128, BGRM 112 treats initial and extending candidate annotations 116 and 118 as two disjoint sets of graph vertices. Vertices from different disjoint sets are connected by BGRM 112 using edges with proper weights. The weight of an edge is defined using the relations between initial and extending words 116 and 118. In this implementation, BGRM 112 sets a nonzero weight to an edge only if the relation of two vertices is close enough—as determined by a configurable threshold. For two vertices $q_i$, $x_j$ of an edge, they have close relation if: (1) $x_j$ is extended by $q_i$; or (2) $q_i$ is quite similar to $x_j$. The weight of the edge is calculated, for example, as follows:

$$w_{ij} = \begin{cases} 1 \text{ if } x_j \text{ is extended by } q_i, \\ s(q_i, x_j | th) \text{ otherwise.} \end{cases} \quad (7)$$

$$s(q_i, x_j | th) = \begin{cases} s(q_i, x_j) \text{ if } s(q_i, x_j) > th \\ 0 \text{ otherwise} \end{cases}$$

Referring to equation 7, $\omega_{ij}$ is the weight, $s(.)$ is the textual similarity between words, and $s(.|th)$ is textual similarity with a pre-defined threshold th.

Suppose, for example, that the initial weight $\omega_{ij}$ is equal to 0. Equation 7 shows that if $x_j$ is extended by $q_i$, the weight $\omega_{ij}$ will be added by 1. If similarity $s(q_i, j)$ between them is above a pre-defined threshold th, $\omega_{ij}$ will be added by $s(q_i, x_j)$. $s(.)$ can have various definitions as long as it can represent the relationship between words. In this implementation, for example, BGRM 112 calculates textual similarity using a conventional technique (e.g., Pucher, M., "Performance Evaluation of WordNet-based Semantic Relatedness Measures for Word Prediction in Conversational Speech", 6th International Workshop on Computational Semantics, Tilburg, Netherlands, 2005). In this implementation, BGRM 112 groups synonyms with the same meaning together to form a synset called a concept. Various concepts are linked to one another, providing a determination of semantic connections between sets of synonyms. In this implementation, the Jiang and Conrath Measure (JNC) can be used to measure semantic distance between two concepts (Jiang, J. and Conrath, D., "Semantic Similarity Based on Corpus Statistics and Lexical Taxonomy", International Conference on Research in Computational Linguistics, 1997). Given two words $w_i$ and $w_j$, BGRM 112 finds associating concepts $c_i$ and $c_j$, and determines maximum similarity among all possible corresponding concept pairs as the semantic similarity (i.e., relationship(s)) for the two words.

Exemplary Reinforcement Learning Algorithm

Initial and extending candidates 116 and 118 are re-ranked with a reinforcement learning algorithm in view of the identified relationships between the two disjoint sets of vertices (i.e., annotations). In this implementation, for example, an exemplary reinforcement algorithm on G is shown in Equation (8). BGRM 112 iterates this equation until convergence.

$$\begin{cases} C_{n+1} = \alpha C_0 + (1-\alpha) L' F_n \\ F_{n+1} = \beta F_0 + (1-\beta) L C_{n+1} \end{cases} \quad (8)$$

Referring to equation 8, $C_0$ and $F_0$ are initial ranking value vectors of the extending and initial candidate annotations, respectively. For purposes of exemplary illustration, such vectors are their respective portion of "other program data" 128. In equation 8, L is an adjacency matrix of G (i.e., bipartite graph 130), and L is both row-normalized and column normalized using Equation (9). $L^T$ is the transpose of L. C and F indicate the new $C_0$ and $F_0$ after iterations. Respective subscripts indicate iteration times. Parameters $\alpha$, $\beta$ are weights ranging from 0 to 1. These weights determine the degree the model relies on the propagated relations between the vertices. The first row of equation 8 addresses the extending annotation 118 ranking update. The second row in equation 8 is directed to re-ranking initial annotations 116. Because $L^T F$ reveals that initial word rankings are propagated to extending word rankings via their link relations, the first row in equation 8 indicates that system 100 utilizes information provided by initial words to reinforce information provided by extending words, while the system maintains a certain confidence on the initial values. Additionally, LC reveals extending word rankings via corresponding link relations to reinforce initial word rankings.

$$L = D_r^{-1} W D_c^{-1} \quad (9)$$

Referring to equation 9, W is the original adjacency matrix of G; $D_r$ is the diagonal matrix with its (i;i)-element equal to the sum of the i-th row of W; $D_c$ is the diagonal matrix with its (i;i)-element equal to the sum of the i-th column of W.

Equation 8 shows, in each iteration, C is first reinforced and F is then reinforced by updated C. In this implementation, equation 8 shows a stronger reliance on initial word ranking than extending word 118 ranking. Such reliance impacts selection of $\alpha$ and $\beta$. In this implementation, for example, the greater value of $\beta$ is chosen to show the more confidence on the initial ranking for initial words 116.

Exemplary Convergence

We now show that the sequences $\{C_n\}$ and $\{F_n\}$ of equation 8 converge to provide a final result. Results can also be obtained without iterations by using the convergence form of equation 8. By the iteration equation 8, we have the following:

$$\begin{cases} C_{n+1} (\gamma L^T L)^{n+1} C_0 + \alpha \left[\sum_{i=0}^{n} (\gamma L^T L)^i\right] C_0 + (1-\alpha)\beta \left[\sum_{i=0}^{n} (\gamma L^T L)^i\right] L^T F_0 \\ F_{n+1} = (\gamma L L^T)^{n-1} F_0 + \beta \left[\sum_{i=0}^{n} (\gamma L L^T)^i\right] F_0 + (1-\beta)\alpha \left[\sum_{i=0}^{n} (\gamma L L^T)^i\right] L C_0 \end{cases}$$

Where $\gamma = (1-\alpha)(1-\beta)$. Since $0<\alpha$, $\beta<1$, and the eigenvalues of $LL^T$ and $L^T L$ are in $[-1, 1]$, for they are normalized symmetric matrix based on row-normalized and column-normalized L:

$$\lim_{n \to \infty} (\gamma L^T L)^{n+1} = 0, \lim_{n \to \infty} \sum_{i=0}^{n} (\gamma L^T L)^n \quad (10)$$
$$= (I - \gamma L^T L)^{-1}$$

and

-continued $$\lim_{n\to\infty} (\gamma LL^T)^{n+1} = 0, \lim_{n\to\infty} \sum_{i=0}^{n} (\gamma LL^T)^n$$
$$= (I - \gamma LL^T)^{-1}$$

Hence.

$$\begin{cases} C^* = \alpha[I - \gamma L^T L]^{-1} C_0 + \beta(1-\alpha)[I - \gamma L^T L]^{-1} L^T F_0 \\ F^* = \beta(I - \gamma LL^T)^{-1} F_0 + \alpha(1-\beta)[I - \gamma LL^T]^{-1} LC_0 \end{cases}$$

Where C* and F* is the converged C and F, respectively. Now BGRM 112 computes C and F directly without iterations.

Exemplary Image Annotation Schemes

In this implementation, and because the ranking values of two sets of candidates 116 and 118 are defined differently, they are treated differently. Three exemplary strategies to determine the final annotations to annotate a target Web image are now described.

An Exemplary Top N Strategy

In one implementation, for example, using a "top N" strategy BGRM 112 selects a fixed number of annotations with highest ranking values. Actually, top $m_1$ initial words 116 and top $m_2$ extending words 118 are selected ($N=m_1+m_2$). Empirically, one can use cross-validation to set suitable $m_1$, $m_2$ values.

An Exemplary Threshold Strategy

In one implementation, for example, BGRM 112 implements a "threshold" strategy to select final annotations from both initial 116 and extending 118 words. If the ranking value of a candidate word is above a threshold, the candidate is chosen. In one implementation, for example, a dynamic threshold dth is used for this purpose, as shown in equation 11.

$$dth = 1/Num(\text{annotations}) \times \eta \qquad (11)$$

Where Num(annotations) is the number of one set of candidate annotations of the target image. Thus, the dynamic threshold is determined individually for initial and extending candidates. Note that for one set of annotations within the target image, their ranking values are normalized to ensure that sum of them is 1. So, 1/Num(annotations) means the average ranking value. $\eta$ is the weight. Therefore, equation 11 expresses that if a candidate's ranking value is larger than the corresponding weighted average ranking value, BGRM 112 selects the candidate.

An Exemplary Modified Threshold Strategy

In one implementation, for example, BGRM 112 determines the number of final annotations according to the number of initial candidates. This implementation, the "threshold" strategy is first utilized to remove imprecise annotations from initial ones. Then extending words with high ranking values are appended to make sure that the number of final annotations is equal to that of the initial candidates. By using the modified threshold strategy, BGRM 112 achieves selection of dynamic numbers of final annotations (cf. top N strategy) with only one parameter estimation (cf. threshold strategy). After selecting final annotations, BGRM 112 merges their ranking values using a unified measure. In one implementation, for example, higher ranking values are provided to initial words. Denote $w_i$ as a selected annotation of an image I. An exemplary final annotation ranking function is shown in equation 12. For initial words Q (116), BGRM 112 linearly shrinks the ranking values F to be within $[t_1, 1]$; for extending words X (118), their ranking values C are shrunk to be within $[0, t_2]$, where $0 < t_1 \leq t_2 < 1$. In this implementation, for example, $t_1 = t_2 = 0.5$, although other values could also be used.

$$R(w_i) = \begin{cases} (1-t_1)F(i) + t_1 & w_i \in Q \\ t_2 C(i) & w_i \in X \end{cases} \qquad (12)$$

Exemplary Process and Data Flow

Figure 2:
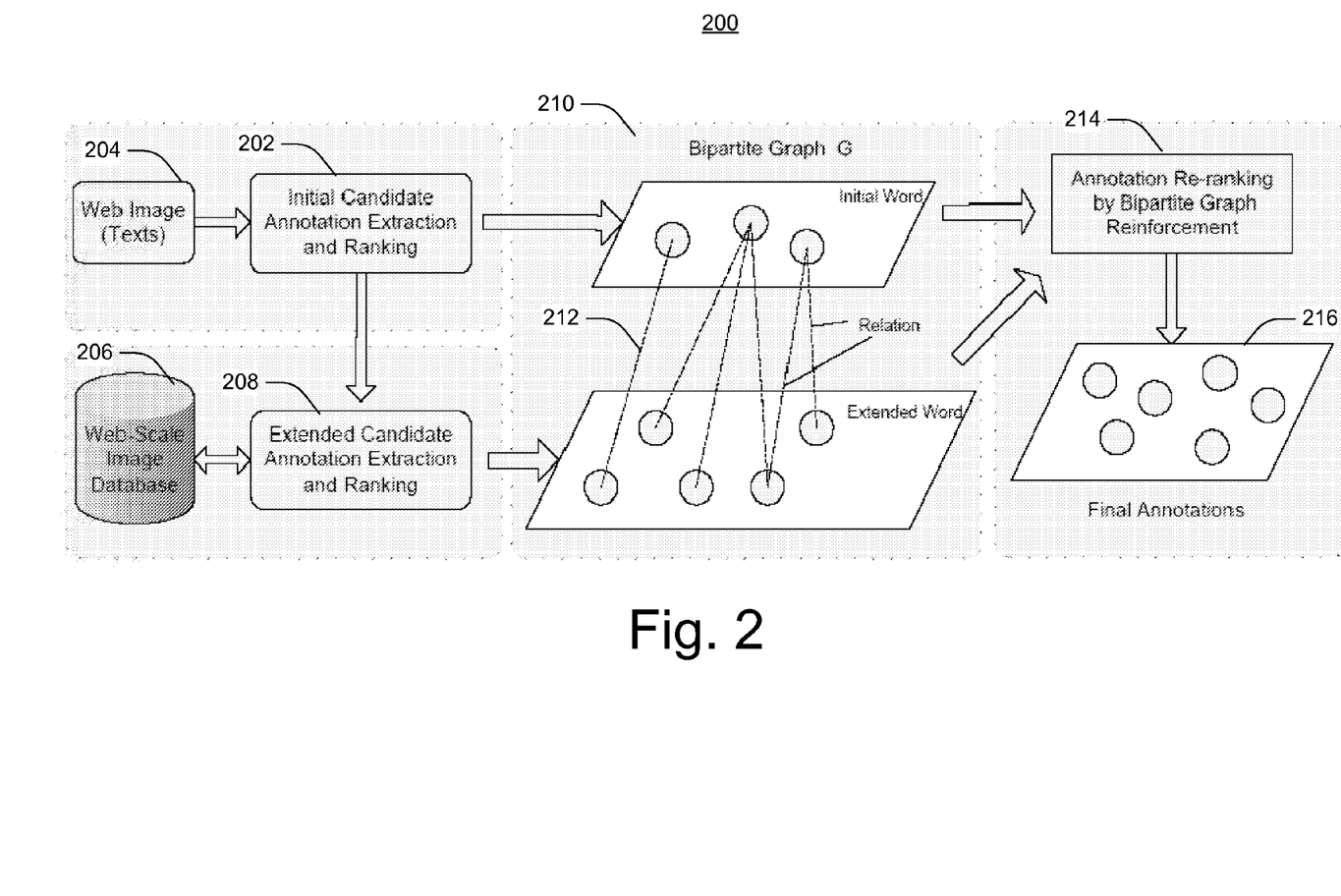

FIG. 2 shows an exemplary process and data flow for bipartite graph reinforcement to annotate web images, according to one embodiment. These data flows and processes have been described above with respect to FIG. 1. Referring to FIG. 2, system 200 performs initial candidate annotation extraction and ranking (202) in view of Web image(s) 204. Using the initial candidate annotations, system 200 mines a web-scale image database 206 to extract and rank extending (extended) candidate annotations 208. Using the initial and extending candidate annotations, system 200 creates bipartite graph 210 using initial words in the initial candidate annotations as a disjoint set of vertices from vertices corresponding to extending words in the extending candidate annotations. Edges 212 represent objectively determined semantically similar relationships/relations between respective vertices across the two disjoint sets of vertices. The ranking values for the initial annotation words and the extending annotation words are then reinforced in view of the relationships modeled/described by the bipartite graph 210 to re-rank each of the annotations. System 200 annotates the Web image associated with the texts 202 with the top N ranked annotations—these are shown as final annotations 216. Conventional Web image indexing operations are used to index the newly annotated Web image to provide a user with relevant results to a search query.

An Exemplary Procedure

Figure 3:
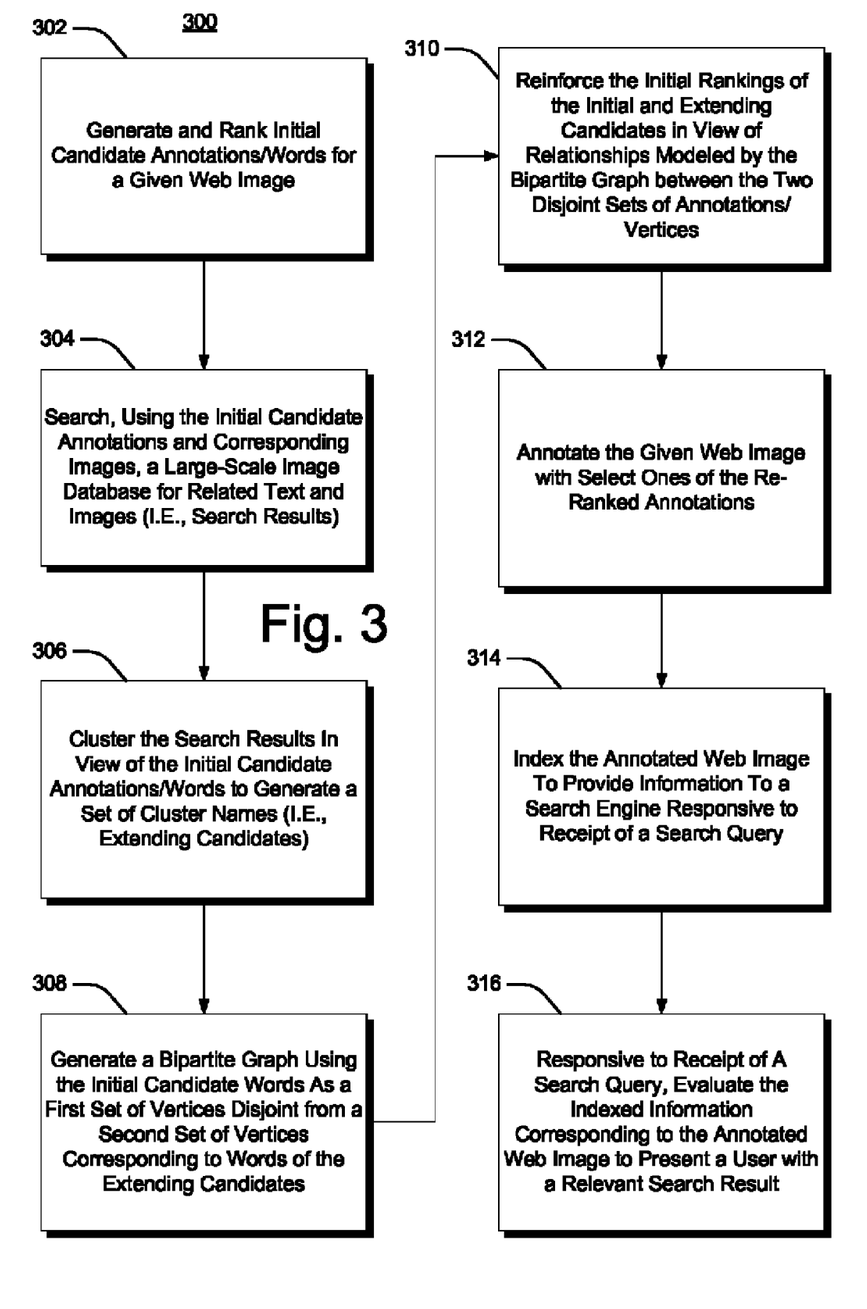

FIG. 3 shows an exemplary procedure 300 for bipartite graph reinforcement modeling to annotate web images, according to one implementation. For purposes of exemplary illustration and description, operations of procedure 300 are described with respect to aspects of FIG. 1. In the description, the left-most numeral of a component reference number indicates the particular figure where the component was first introduced. In one implementation, operations of procedure 300 are implemented by respective computer program modules 108 of computing device 102 of FIG. 1.

Referring to FIG. 3, operations of block 302 generate and rank initial candidate annotations/words 116 (FIG. 1) for a given target Web image. Operations of block 304 search, using the initial candidate annotations and images corresponding to respective ones of the initial annotations, a large scale image database for related text and images (i.e., search results 126). Operations of block 306 cluster the search results in view of the initial candidate annotations to generate a set of cluster names (i.e., extending candidates 118). Operations of block 308 generate a bipartite graph 130 using the initial candidate annotations as a first set of vertices disjoint from a second set of vertices corresponding to words of the extending candidates 118. Operations of block 310 reinforce initial rankings of the initial and extending candidates 116 and 118. These reinforcement operations re-ranked the annotations based on relationships modeled by the bipartite graph.

These relationships are between vertices in the two disjoint sets of annotations/vertices. Operations at block 312 annotate a given target Web image with select ones of the re-ranked annotations, thereby generating annotated Web image 132. In one implementation, for example, target Web image is annotated with select ones of the re-ranked annotations using a threshold strategy or a modified threshold strategy. In another implementation, the target Web image is annotated with a configurable number of annotations indicating highest re-ranked values.

Operations of block 314 index the annotated Web image 132 using conventional indexing operations to provide a search engine 124 with information to present a user with relevant search results. In one implementation, such an indexing service is local to computing device 102. In another implementation, such an indexing service is remote to computing device 102. Operations of block 316 evaluate the indexed information associated with the annotated Web image to provide a user with relevant search results to a search query.

Conclusion

Although the above sections describe bipartite graph reinforcement modeling to annotate web images in language specific to structural features and/or methodological operations or actions, the implementations defined in the appended claims are not necessarily limited to the specific features or actions described. Rather, the specific features and operations to preserve validity of upper data layers for software fuzzing using lower data layers are disclosed as exemplary forms of implementing the claimed subject matter.

The invention claimed is:

1. A method at least partially implemented by a computing device, the method comprising:
   determining, using bipartite graph reinforcement modeling, a set of annotations relevant to a Web image, wherein determining the set of annotations comprises:
      generating initial candidate annotations for the Web image;
      ranking relevancy of the initial candidate annotations to the Web image using a first ranking algorithm, the first ranking algorithm comprising obtaining a first initial candidate annotation ranking and a second initial candidate annotation ranking for each initial candidate annotation and fusing the first initial candidate annotation ranking and the second initial candidate annotation ranking using a weighted linear combination scheme;
      identifying, using the initial candidate annotations, extending candidate annotations by submitting each word and corresponding image associated with the initial candidate annotations as a respective query to an image search engine to receive search results and clustering the search results in view of the initial candidate annotations to obtain cluster names, the extending candidate annotations comprising the cluster names;
      ranking relevancy of the extending candidate annotations using a second ranking algorithm that is different than the first ranking algorithm by determining an average similarity between images in a cluster and the Web image and weighting the average similarity with textual information associated with the cluster name, the cluster corresponding to the cluster name;
      identifying, at least partially in view of relevancy rankings of the initial candidate annotations and the extending candidate annotations, relationships between two disjoint sets of vertices in a bipartite graph, a first set of the two disjoint sets of vertices representing the initial candidate annotations, a second set of the two disjoint sets of vertices representing the extending candidate annotations;
      re-ranking the initial candidate annotations and the extending candidate annotations based on the relationships between the two disjoint sets of vertices in the bipartite graph;
      annotating the Web image based on the re-ranked initial candidate annotations and the extending candidate annotations; and
      providing the Web image to an indexing service for indexing and presentation of relevant search results to a user search query, the relevant search results being based on at least a subset of the annotations.

2. The method of claim 1, wherein determining the set of annotations relevant to the Web image further comprises:
   generating a bipartite graph from a first and a second set of vertices, the first and the second set of vertices being disjoint from one another, the first set of vertices representing direct descriptions of the Web image, a second set of vertices representing indirect descriptions of the Web image; and
   wherein the bipartite graph models relations between the first and the second sets of vertices.

3. A tangible computer-readable medium having encoded thereon computer-program instructions executable by a processor, the computer-program instructions when executed by the processor, for performing operations comprising:
   submitting, for each word in a first set of annotations, a search query to an image search engine to generate a set of search results, the search query comprising the word and an image associated with the word;
   clustering the search results in view of words in the first set of annotations to obtain cluster names, obtaining a second set of annotations comprising the cluster names;
   modeling relationships between the first set and the second set of annotations in a bipartite graph, the bipartite graph comprising vertices representing the first set of annotations disjoint from the second set of annotations, the first set of annotations being direct descriptions of a target Web image, the second set of annotations being indirect descriptions of the target Web image;
   reinforcing, using respective ones of the relationships, initial rankings associated with the first set of annotations and the second sets of annotations by a reinforcement learning algorithm, the first set of annotations ranked according to a ranking algorithm comprising:
   obtaining a first initial candidate annotation ranking and a second initial candidate annotation ranking for each annotation in the first set of annotations, and
   fusing the first initial candidate annotation ranking and the second initial candidate annotation ranking using a weighted linear combination scheme;
   selecting a subset of the first and the second sets of annotations based on results of reinforcing the initial rankings, wherein the subset represents annotations determined with a modified threshold strategy;
   annotating the Web image with the subset to generate an annotated Web image; and
   providing indexing and search engine applications with access to the annotated Web image to present a user with relevant results to a search query.

4. The tangible computer-readable medium of claim 3, wherein the initial rankings are determined with first and second ranking algorithms, the first ranking algorithm being different than the second ranking algorithm, the first ranking algorithm being used to determine initial rankings of the first set of annotations, the second ranking algorithm being used to determine initial rankings of the second set of annotations.

5. The tangible computer-readable medium of claim 3, wherein operations for reinforcing the initial rankings converge through iteration.

6. The tangible computer-readable medium of claim 3, wherein the operations further comprise removing duplicate names from the cluster names after clustering the search results.

7. The tangible computer-readable medium of claim 3, wherein the operations further comprise operations for mining a large-scale image database for the first set of annotations and the second sets of annotations.

8. A computing device comprising:
a processor; and
a memory coupled to the processor, the memory having encoded thereon a set of computer-program instructions executable by the processor, the computer-program instructions when executed by the processor for performing operations comprising:
generating and ranking initial candidate annotations for a Web image, the ranking initial candidate annotations comprising utilizing a first ranking algorithm that obtains a first initial candidate annotation ranking and a second initial candidate annotation ranking for each initial candidate annotation and fuses the first initial candidate annotation ranking and the second initial candidate annotation ranking using a weighted linear combination scheme;
searching a large-scale image database for search results, the search results comprising text and images related to the initial candidate annotations and corresponding image(s);
clustering the search results based on the initial candidate annotations to create a set of clusters;
selecting a set of extending candidate annotations based on names of the set of clusters;
determining ranking values for each extending candidate annotation in the set of extending candidate annotations using a calculated average similarity between the Web image and images in a corresponding cluster;
generating a bipartite graph using the initial candidate annotations as a first set of vertices disjoint from a second set of vertices representing the extending candidate annotations;
reinforcing initial relevancy rankings of the initial candidate annotations and the extending candidate annotations by a reinforcement learning algorithm in view of relationships modeled by the bipartite graph between the two disjoint sets of vertices, the initial relevancy rankings indicating respective relevancy of each annotation of the initial candidate annotations and the extending candidate annotations to the Web image;
re-ranking, by the reinforcement learning algorithm, the initial relevant rankings of initial candidate annotations, and the extending annotations based on the propagated relations between the vertices with weighted parameters to create re-ranked results;
based on the re-ranked results annotating the Web image with a subset of the initial candidate annotations and the extending candidate annotations;
generating an index from the subset;
evaluating the index to present a search result to a search query from a user; and
selecting the subset by evaluating re-ranked relevancy values generated by reinforcing the initial relevancy rankings, the evaluating comprising selecting a set of final annotations using a threshold algorithm that assigns higher weight to relevancy rankings associated with words in the initial candidate annotations.

9. The computing device of claim 8, wherein:
the initial candidate annotations represent direct descriptions of the Web image, and the extending candidate annotations represent indirect descriptions of the Web image.

10. The computing device of claim 8, wherein searching the large-scale image database further comprises submitting a text-based image search query to the image search engine.

11. The computing device of claim 8, wherein the operations further comprise operations for ranking the initial candidate annotations with a first relevancy ranking algorithm that is different from a second relevancy ranking algorithm used to rank the extending candidate annotations.

* * * * *